United States Patent [19]

Lenhart

[11] Patent Number: 5,769,324
[45] Date of Patent: Jun. 23, 1998

[54] PORTABLE WASHING DEVICE

[76] Inventor: David A. Lenhart, P.O. Box 368, Picture Rocks, Pa. 17762

[21] Appl. No.: 740,853

[22] Filed: Nov. 4, 1996

[51] Int. Cl.$^6$ ........................................ B05B 9/47
[52] U.S. Cl. .................... 239/320; 239/303; 239/321; 239/323; 239/331; 239/373; 239/532
[58] Field of Search ................... 239/303, 308, 239/316, 310, 320, 321, 323, 327, 328, 329, 331, 337, 373, 532, 578; 222/386.5; 141/18, 20.5, 25, 26, 311 R, 313, 317

[56] References Cited

U.S. PATENT DOCUMENTS

| | | | |
|---|---|---|---|
| 566,282 | 8/1896 | Bailey, Jr. | 222/386.5 |
| 702,478 | 6/1902 | Radcliffe | 222/79 |
| 1,085,789 | 2/1914 | Bennett | 222/390 |
| 1,384,296 | 7/1921 | Baumgardner | 222/23 |
| 1,623,504 | 4/1927 | Stiriss | 239/331 X |
| 1,731,767 | 10/1929 | Cramer | 222/386.5 |
| 1,880,354 | 10/1932 | Mueller | 222/79 |
| 2,097,985 | 11/1937 | Maryott | 222/386.5 |
| 2,793,379 | 5/1957 | Moore | 401/46 |
| 2,865,541 | 12/1958 | Hicks | 222/386.5 |
| 3,377,003 | 4/1968 | Bacon et al. | 222/386 |
| 3,848,808 | 11/1974 | Fetty et al. | 239/327 |
| 4,167,245 | 9/1979 | Kock et al. | 239/11 |
| 4,257,460 | 3/1981 | Paranay et al. | 141/26 |
| 4,732,503 | 3/1988 | Bader et al. | 401/197 |
| 4,854,480 | 8/1989 | Shindo | 222/79 |
| 5,316,215 | 5/1994 | Mitchell | 239/67 |
| 5,511,698 | 4/1996 | Solignac | 239/331 X |

Primary Examiner—Lesley D. Morris
Attorney, Agent, or Firm—Synnestvedt & Lechner

[57] ABSTRACT

Portable washing apparatus having a self-contained pressurized supply of a washing liquid is disclosed. The apparatus is charged with the washing liquid from a pressurized source of the liquid via an independent charging stand connected to the source. Hydraulic pressure of the source charges the apparatus with the washing liquid and cocks or biases the biasing means of the apparatus to a pressurized state. A trigger-operated valve provides for selective discharge of the liquid from the apparatus. An auxiliary reservoir holding a cleaning agent is provided on the apparatus, as well as a scrubbing means. The cleaning agent is mixed with the washing liquid as desired and appropriate for the washing task being performed.

23 Claims, 4 Drawing Sheets

PORTABLE WASHING DEVICE

FIELD OF THE INVENTION

This invention relates to portable washing devices carrying a pressurized supply of a washing liquid independently of a source of the washing liquid.

BACKGROUND OF THE INVENTION

Traditional methods of washing articles, such as vehicles or structures, are seriously constrained by the need for a ready supply of pressurized water to be used in conjunction with soaps or detergents for washing and rinsing the article. A vehicle, for example, must be placed in proximity to a convenient tap or faucet when being washed. Permanent structures, such as sheds, statuary, houses or other edifices, require that special arrangements be made to ensure that an adequate supply of pressurized water is available at the site. This could involve extensive use of hoses or other conduits to bring the water specifically to where it is needed.

Although hoses are traditionally used to supply pressurized water to a site remote from the water source, hoses pose numerous constraints and concomitant disadvantages on the user. Hoses become heavy and unwieldy when used in any significant length; the couplings tend to leak under the pressure. Hoses can snag on objects, become kinked or rupture. Hoses and their couplings, if dragged across a surface such as an automobile hood or a boat deck, can damage the finish. A common frustrating experience occurs when a hose becomes wedged beneath a wheel of an automobile being washed, requiring a special effort to dislodge the hose, maneuver a sufficient length of the hose away from the wheels and then drag the length of hose to the new position. A dangerous situation can arise, for example, if a hose is used to wash windows on the higher stories of a house or to remove detritus from gutters. A person working on a ladder or on a pitched roof would be in some jeopardy dealing with an unwieldy, water laden hose while balancing on the ladder or the roof. Clearly, improvements can be made in the washing apparatus.

Although there are devices which provide pressurized water delivery to a site, these devices generally do not address the problems enumerated above. The user must still contend with a hose coupled to some source of the water to deliver the water directly to the desired location. For example, U.S. Pat. No. 1,731,762 to Cramer, U.S. Pat. No. 2,097,985 to Maryott, U.S. Pat. No. 2,793,379 to Moore and U.S. Pat. No. 2,865,541 to Hicks all disclose dispensing, spraying or washing apparatus, but all of these disclosures lack portability and independence from the pressurized source. None of the above-mentioned patents uses the hydraulic pressure to bias an internal pressurizing means but, instead, use the hydraulic pressure directly to discharge the liquid to be sprayed.

SUMMARY AND OBJECTS OF THE INVENTION

This invention provides a portable, self-contained washing apparatus carrying its own supply of pressurized water or other washing liquid. The washing device is semi-independent of a source of water in that no hose or other line need be attached to the apparatus when in use. A supply of water is carried within the to device. Furthermore, the device does not depend on any external source for pressurization of its internal water supply. The device does require a pressurized source of water to provide an initial charge of water and to bias the internal pressurization feature to a pressurized status, but once this charging step is accomplished, the device can be used remote from and independent of the pressurized source of water until the internal supply is exhausted.

The washing apparatus according to the invention comprises a portable, elongated wand having an internal cavity comprising a reservoir. Portability of the wand is achieved by using materials such as aluminum, rubber and plastic in the construction of the apparatus to ensure a lightweight design which is easy to handle. The outer surface of the wand serves as its handle and is designed to be easily gripped by the user, allowing the wand to be conveniently carried and manipulated when performing the washing task. The elongated design of the wand allows a user to easily reach and wash hard to get at surfaces, such as the roof of a car or a van or the undercarriage of a vehicle. The elongated wand contains a relatively large volume reservoir within the handle, providing a generous water supply for all washing needs. The elongated design also has inherently good stability and balance characteristics, making the apparatus less fatiguing to use than conventional washing means.

An inlet tube is ported into the reservoir to provide a means for charging the device from the pressurized source of water which could, for example, be a conventional household tap. The inlet tube has an inlet valve which is normally biased to a closed position but is opened when the inlet tube is interengaged with a mating filling tube which is connected to the pressurized source. The filling tube projects from an independent charging stand which is connected to the water source and supports the filling tube so that the inlet tube can be conveniently mated to the inlet tube. The filling tube has a filling valve normally biased to a closed position which opens when the inlet tube is interengaged with the filling tube under sufficient force. Both inlet and filling valves have separate coupling parts interengagable in interfacing relationship which open simultaneously with the application of the force when the tubes are mated, thereby establishing a fluid flow path allowing water under pressure from the source to flow through the charging stand into the reservoir. When the reservoir is fully charged, the inlet tube is disengaged from the mating filling tube, the inlet and filling valves close under their biasing means, the filling valve cuts off the flow of water from the source and the inlet valve seals the reservoir. Upon disengagement, the portable wand is separated from the charging stand and can be conveniently carried to a remote site for use until the charge of water is exhausted, whereupon the wand can be returned to the charging stand for further charging.

The water supply held in the reservoir is pressurized by an internal reservoir biasing means which is "cocked" or brought to a pressurized status by the pressure of the water source as the water charges the reservoir. The charging step thus fulfills two functions—it fills the reservoir with water and biases the internal pressurizing means.

A nozzle is also connected to the reservoir for discharging the water supply, as required in the washing task. The nozzle has a discharge valve which is also normally biased to a closed position. The valve is operatively connected to a trigger or other manual control means conveniently positioned on the reservoir or the handle, and the water is dispensed selectively (under the pressure provided by the internal biasing means) by means of the trigger actuating the nozzle's discharge valve. The nozzle can be curved to discharge water at an angle to the reservoir, allowing for the ergonomically convenient or advantageous placement of the hands and arms of a user when performing a task with the invention. A brush, mop or other scrubbing means can be mounted on the distal end of the nozzle to facilitate the cleaning action of the invention, the scrubbing means having an outlet or port communicating with the nozzle to allow discharge of the water through the scrubbing means.

Two reservoir biasing means are readily employable with the invention. The first reservoir biasing means comprises an elastic bladder or tube disposed within the reservoir and connected to the inlet tube and the discharge nozzle. When the inlet tube is interengaged with the filling tube on the charging stand and sufficient force is applied, the inlet and filling valves open and water under pressure from the source floods into the elastic tube. The tube stretches elastically due to the hydraulic pressure of the source until the reservoir is filled. When the inlet and filling tubes are disengaged, the respective inlet and filling valves close and the reservoir is then pressurized by the elastic forces of the stretched tube. Pressure provided by the stretched tube forces the water within the reservoir out through the discharge nozzle on demand from the user when the nozzle discharge valve is opened by the trigger control means.

A second reservoir biasing means comprises a piston which fits tightly but slidingly within the reservoir forming a water tight seal between the reservoir wall and the piston. The piston is biased within the reservoir by means of a spring, the piston and spring being so arranged that when the reservoir is charged from the charging stand, the hydraulic pressure of the water displaces the piston within the reservoir against the biasing spring. After the reservoir is filled and the inlet and filling tubes are disengaged, the water supply within the reservoir is pressurized by the spring loaded piston acting against the water within the reservoir. As the water is discharged through the nozzle, the piston travels within the reservoir forcing the water out under the action of the spring.

It may be desirable to provide a cleaning agent, such as a soap or detergent, simultaneously with the water to provide a washing capability, as well as a rinsing function within the invention. A second reservoir is employed which is mounted on the water reservoir and filled with the cleaning agent. A tube connects the second reservoir to the nozzle. The agent can be conveyed to the nozzle by suction or siphon action caused as water flows through the nozzle, drawing the cleaning agent into the nozzle where it mixes with the water. Alternatively, a pump can be used to draw a measured amount of the cleaning agent from the second reservoir and inject the agent into the nozzle somewhere between the distal end of the nozzle and the discharge valve. The cleaning agent mixes with the water as it flows through the nozzle upon discharge from the reservoir. It may be desirable to provide a mixing chamber within the nozzle to promote the mixing of the cleaning agent with the water.

It is an object of the invention to provide a portable, self-contained washing device having its own independent pressurized supply of a washing liquid.

It is an object of the invention to provide a washing device which is internally pressurized by means of the hydraulic pressure of the source of the washing liquid.

It is an object of the invention to provide a washing device which can be easily, conveniently and rapidly recharged from a mating charging stand and removed from the stand to be used at a remote site without the restrictions imposed by a hose.

It is an object of the invention to provide a washing device which can be easily and conveniently handled and manipulated during a washing task.

These and other objects and advantages of the invention will become apparent from a consideration of the following drawings and detailed description of preferred embodiments of the invention.

DETAILED DESCRIPTION OF THE PREFERRED EMBODIMENT OF THE INVENTION

Figures 1, 2:
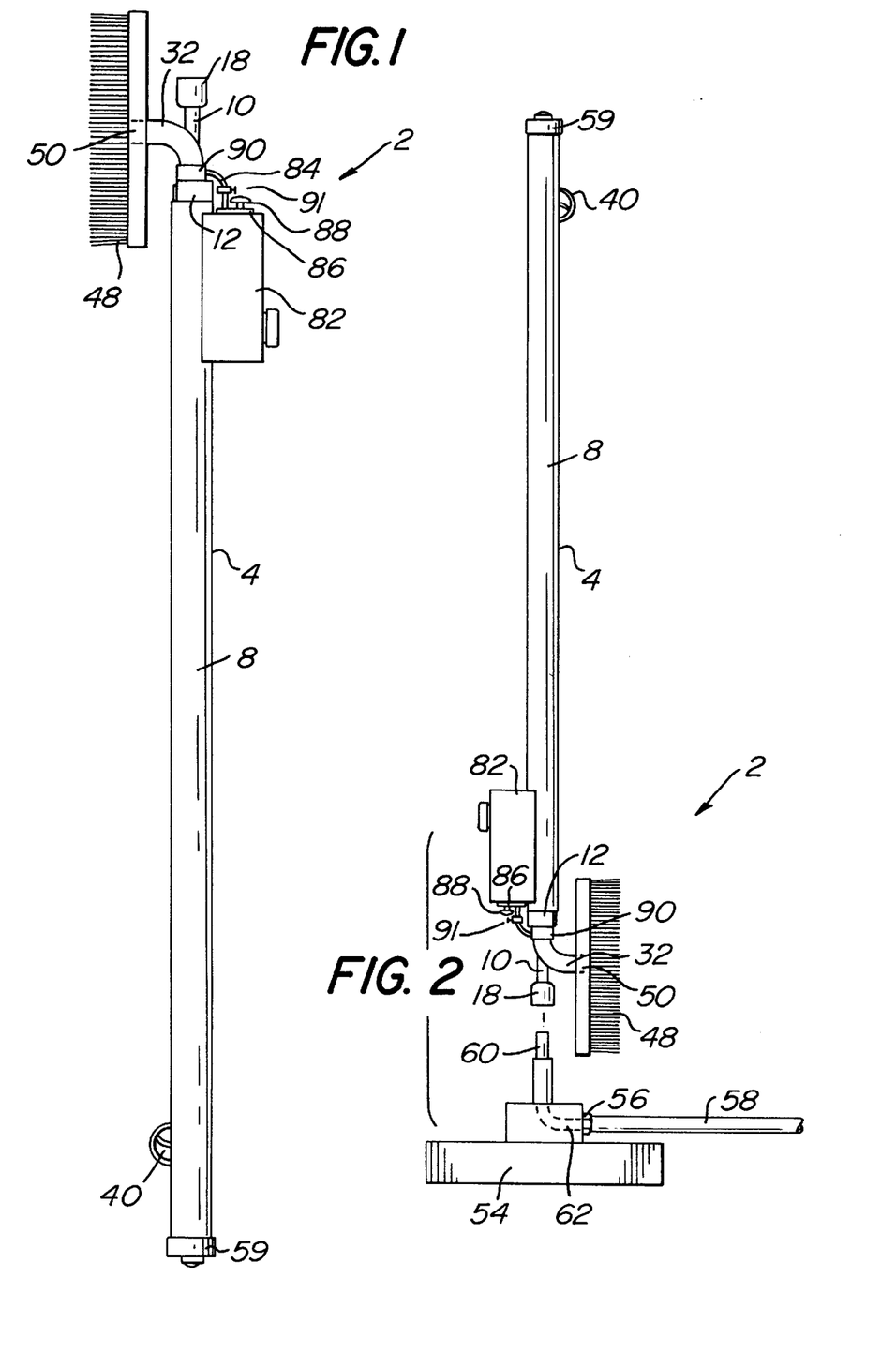
FIG. 1 shows a side view of the portable washing apparatus according to the invention.
FIG. 2 shows a side view of the portable washing apparatus being disengaged from the independent charging stand.
Figure 3:
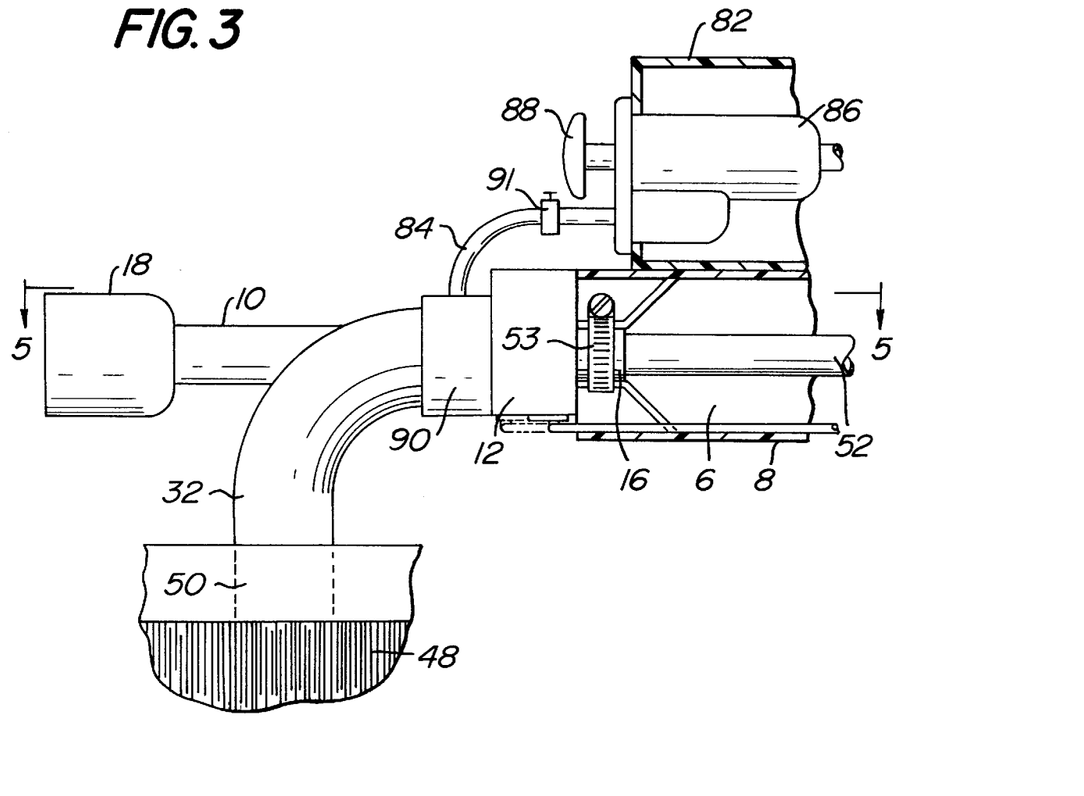
FIG. 3 shows a detailed cross-sectional view on an enlarged scale of the nozzle end of the washing apparatus.
Figure 4:
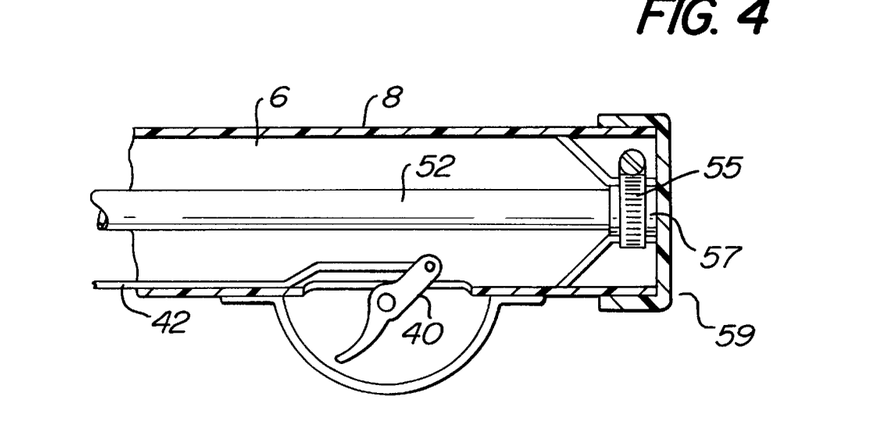
FIG. 4 shows a detailed cross-sectional view on an enlarged scale of the trigger end of the washing apparatus.

FIGS. 1 and 2 show a preferred embodiment of the washing apparatus 2 according to the invention comprising a portable wand 4 having an internal cavity comprising a first, preferred form of an expandable reservoir 6, as seen in FIGS. 3 and 4. Reservoir 6 receives and holds a supply of washing liquid dispensed from a pressurized source, as will be described in more detail hereinafter. The outer surface 8 of wand 4 is designed to provide an elongated handle means to facilitate manual gripping and manipulation of the apparatus 2.

Figure 5:
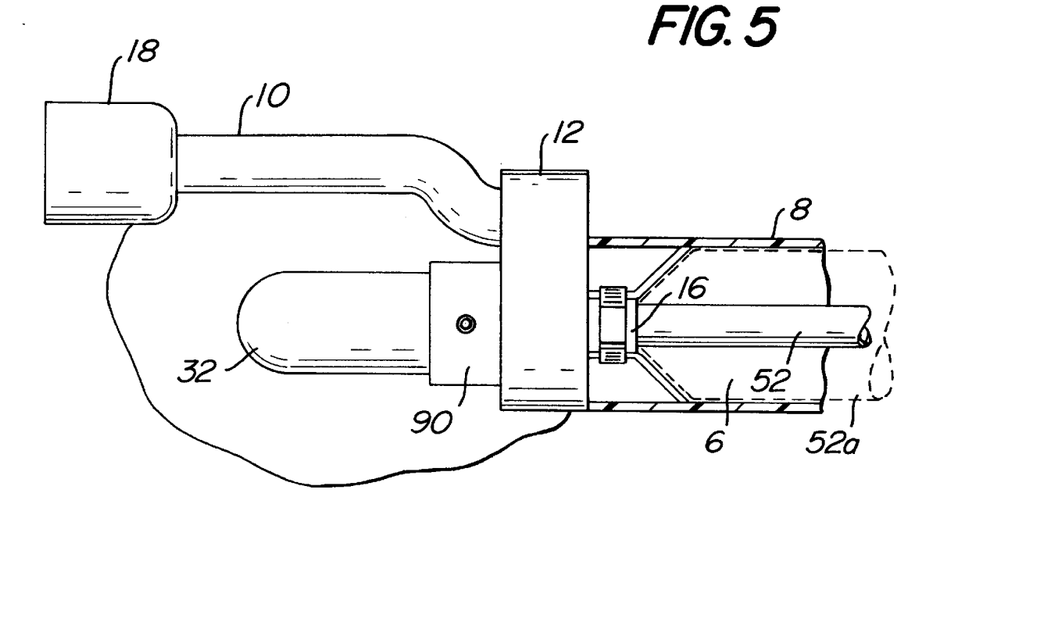
FIG. 5 shows a detailed cross-sectional top view on an enlarged scale of the nozzle end of the washing apparatus.
Figure 6:
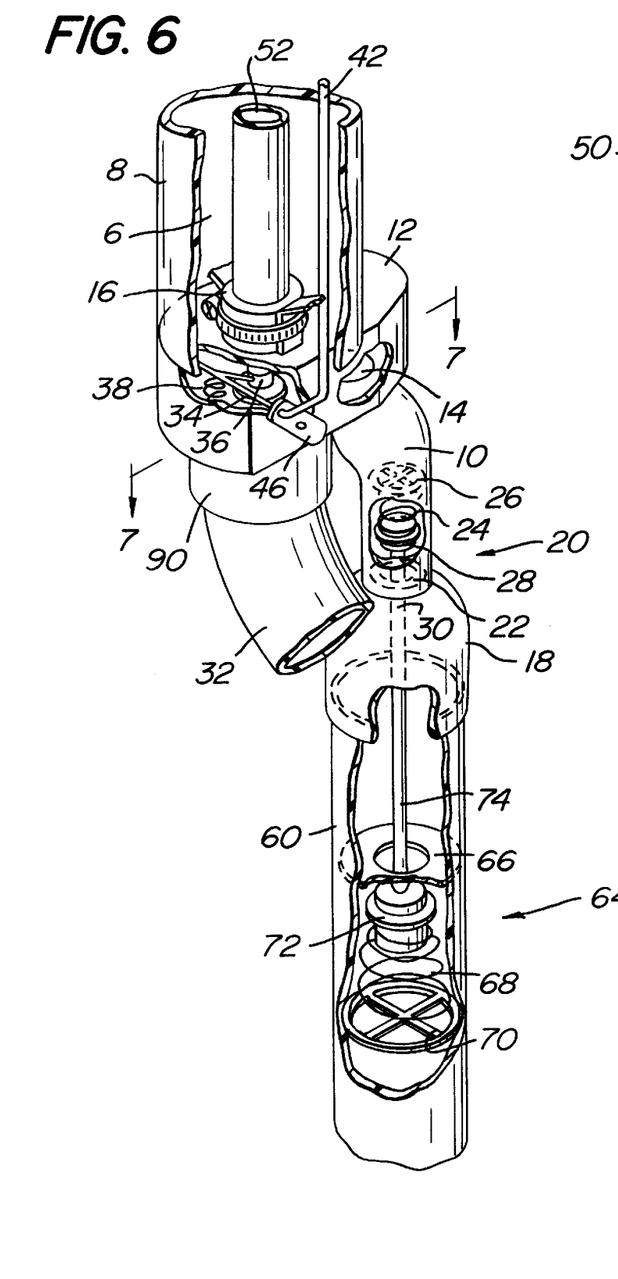
FIG. 6 shows a detailed, cut away view of a portion of the washing apparatus engaging a portion of the charging stand.
Figure 7:
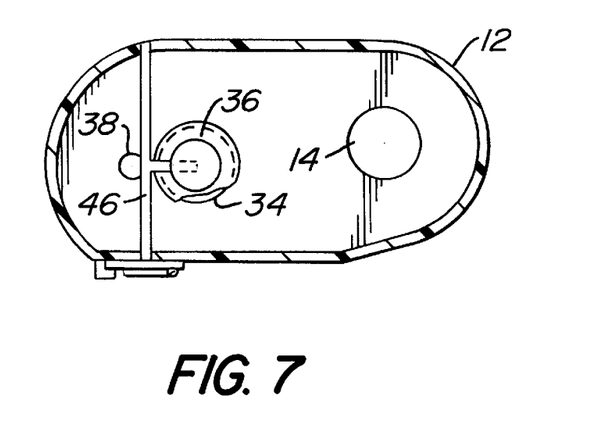
FIG. 7 is a cross-sectional view of the washing apparatus taken along line 7—7 of FIG. 6.

An inlet tube 10 projects clear of wand 4 and is ported into a manifold 12 by means of inlet aperture 14, as shown in FIGS. 6 and 7. Manifold 12 is mounted on one end of wand 4 and communicates with reservoir 6 through manifold port 16, shown in FIGS. 5 and 6. Inlet tube 10 has a shroud 18 mounted on the tube's distal end. Inlet tube 10 also houses an inlet valve 20, seen in FIG. 6, comprising valve seat 22, biasing spring 24, spring retaining spider 26 and valve element 28, which is normally biased to a closed position against seat 22 by spring 24. A valve rod 30 extends outwardly from valve element 28 into shroud 18. Inlet valve 20 is opened by applying a predetermined compression force to valve rod 30, thereby moving valve element 28 away from seat 22 against biasing spring 24.

A nozzle 32 is also mounted on manifold 12, as seen in FIG. 1 and shown partly cut away in FIG. 6. A nozzle port 34 in manifold 12 allows nozzle 32 to communicate with manifold 12 and consequently with reservoir 6 through manifold port 16 as illustrated in FIGS. 6 and 7. Associated with nozzle 32 is a discharge valve 36 which is normally biased to a closed position by discharge valve biasing spring 38, closing off reservoir 6 from nozzle 32 by sealing nozzle port 34. A trigger 40, shown in FIG. 1 and in detail in FIG. 4, is mounted conveniently on wand 4 and is operatively connected to discharge valve 36 by means of pawl 42 and lever assembly 46, as shown in FIG. 6. An operator squeezing trigger 40 opens discharge valve 36 against its biasing spring 38 to selectively release washing liquid from the supply held in reservoir 6. A scrubbing means 48, shown in FIG. 1, comprising typically a mop head, a brush or any other scrubbing or applicating device is mounted on the distal end of nozzle 32. Scrubbing means 48 has a discharge port 50, shown in phantom line, communicating with nozzle 32 and allowing the washing fluid flowing through the nozzle to be applied to the surface being washed through the scrubbing means 48. Nozzle 32 is angled, as shown in FIG. 1, to promote non-fatiguing ergonomically advantageous use of the wand 4 and scrubbing means 48 as a washing device.

Internal to wand 4 is a reservoir biasing means for applying a predetermined pressure on the supply of washing liquid held in the reservoir 6. The biasing means provides apparatus 2 with an independent source of pressure for discharging the washing liquid through nozzle 32. One biasing means is shown in FIGS. 3 and 4 and comprises an elastic tube or bladder 52. Elastic tube 52 communicates with both inlet tube 10 and nozzle 32 through manifold 12, as seen in FIG. 6. Clamp 53 sealingly secures one end of elastic tube 52 to manifold port 16. Another clamp, shown at 55 in FIG. 4, secures and seals the other end of elastic tube 52 to a projection 57 located at an end 59 of wand 4 opposite manifold 12. Tube 52 is substantially smaller than the cavity within wand 4, allowing tube 52 to expand freely over its elastic range within the cavity to a biasing position for applying a predetermined biasing pressure to the washing liquid held in the reservoir, as will be subsequently explained in detail.

Elastic tube 52 is charged with the washing liquid by means of an independent charging stand 54, seen in FIG. 2. Charging stand 54 has a coupling 56 connecting stand 54 to a hose 58 which is in turn connected to a pressurized source of a washing liquid, typically a household water tap or faucet (not shown). Stand 54 has a filling tube 60 projecting away from the stand. Filling tube 60 communicates with the pressurized source of water through a conduit or fluid connection 62, shown in phantom line. A filling valve 64, shown in FIG. 6, is located within filling tube 60 and comprises a valve seat 66, a biasing spring 68, a spring retaining spider 70 and a valve element 72. Valve element 72 is normally biased to a closed position against seat 66 by spring 68, thereby sealing filling tube 60. A valve rod 74 extends outwardly from valve element 72 toward the distal end of filling tube 60. Filling valve 64 is similar to inlet valve 20 in that valve 64 will open when a predetermined compressive force is applied to valve rod 74 sufficient to move valve element 72 away from seat 66 against the biasing action of spring 68 and the hydraulic pressure of the source of the washing liquid.

Filling tube 60 and shroud 18 are designed to be sealingly interengagable, as shown in FIG. 6. When shroud 18 on inlet tube 10 is forcibly interengaged with filling tube 60 by holding the wand with the inlet tube pointing downwardly and pressing it against the filling tube. The shroud 18 seals the tubes together opening the valves 20 and 64 to establish a fluid flow path from filling tube 60 through inlet tube 10, through inlet port 14, into manifold 12, through manifold port 16 and finally into elastic tube 52 in reservoir 6. More particularly, valve rod 30 of inlet valve 20 interengages valve rod 74 of filling valve 64 in interfacing relationship, as seen in FIG. 6. The mutual compressive force on the respective valve rods 30 and 74 move respective valve elements 28 and 72 away from their respective seats 22 and 66, simultaneously opening both inlet valve 20 and filling valve 64. Water is thereby permitted to flow under the hydraulic pressure from the source through hose 58, through conduit 62 into filling tube 60, through inlet tube 10, into manifold 12 and finally into elastic tube 52 in reservoir 6. The water under hydraulic pressure stretches the elastic tube 52 to a biasing position, the tube 52 expanding to substantially fill the cavity comprising the reservoir 6, as shown in phantom at 52a in FIG. 5. Once reservoir 6 is filled, inlet tube 10 is disengaged from filling tube 60 by separating wand 4 from stand 54, as seen in FIG. 2. Valve rods 30 and 74 are disengaged from interfacing relationship relieving the mutual compressive force and respective biasing springs 24 and 68 of inlet valve 20 and filling valve 64 close those valves. The filling valve 64 cuts off the flow of water from the source, and the inlet valve 20 seals the manifold 12 to prevent leakage back out through inlet tube 10. The elastic tube, shown in FIG. 5 in both full lines 52 in the unstretched condition and in phantom lines 52a in the stretched condition, has been stretched by the hydraulic pressure of the source into a biasing position, wherein elastic forces within tube try to return it to its original tubular shape and dimensions, as shown in full lines 52. These elastic forces squeeze the water within reservoir 6, thereby applying a predetermined pressure to the supply of washing liquid held within the reservoir. Wand 4, now separated from charging stand 54, can be carried away from the stand to be used in a washing task. The predetermined pressure provided by the elastic forces of tube 52a is sufficient to expel the water from reservoir 6 when discharge valve 36 is opened by squeezing trigger 40. However, the reservoir internal pressure due to the elastic bladder forces is necessarily less than the hydraulic forces of the source which charged the tube to its pressurized state.

Figure 8:
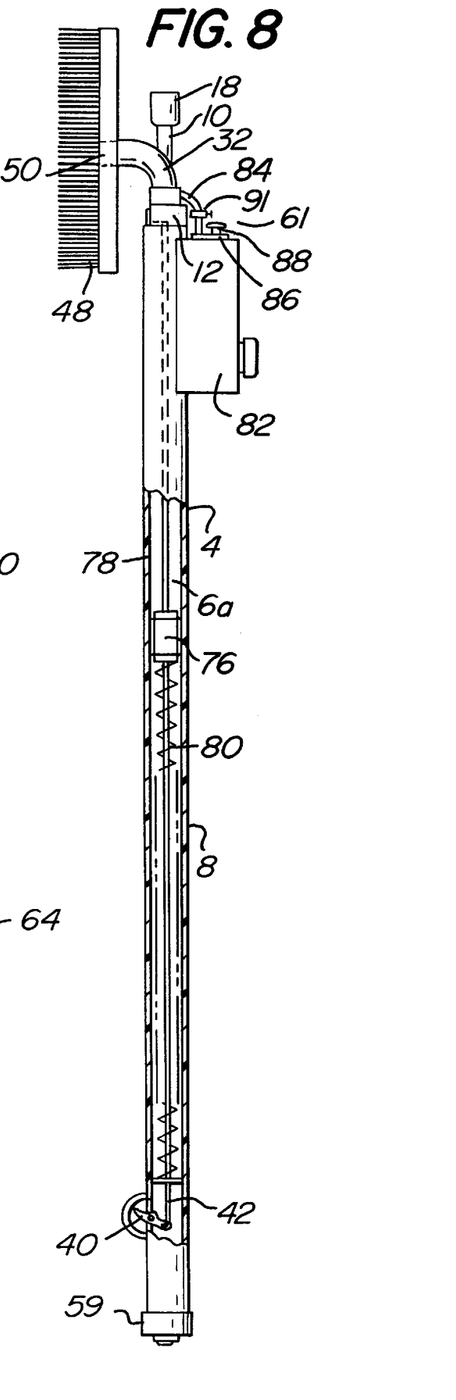
FIG. 8 is a partially cut away side view of the portable washing apparatus according to the invention.

An alternative reservoir pressurizing means can be seen in FIG. 8. A piston 76 slidingly interfits within the cavity comprising reservoir 6 in wand 4, the cavity now forming a piston chamber 6a between piston 76 and wand end 61. Piston 76 is dimensioned relatively to internal reservoir wall 78 such that a substantially water-tight seal is formed between the piston 76 and wall 78. A biasing spring 80 located between piston 76 and end 59 of wand 4 biases piston 76 toward the inlet and nozzle end of the wand 4 denoted as end 61 in FIG. 8. Water flowing into reservoir 6 through inlet tube 10 from filling tube 60 during the filling procedure, as described above, encounters piston 76 in its biased position, and the hydraulic pressure of the source displaces piston 76 against biasing spring 80, biasing piston 76 to a pressurized state and expanding the piston chamber 6a. When the inlet tube 10 and filling tube 60 are disengaged, inlet valve 20 and filling valve 64 close, as described above. Piston 76, under the force of the now compressed biasing spring 80, exerts a predetermined pressure on the supply of water held in piston chamber 6a. The predetermined pressure is sufficient to expel the water through discharge valve 36 and nozzle 32 when trigger 40 is squeezed to open discharge valve 36. As the water is discharged, piston 76 moves under the force of biasing spring 80 back towards end 61 of wand 4.

It is often desirable to combine the application of a soap or a detergent with the water to the surface being washed. The invention is equipped with an auxiliary or second reservoir 82 which can be loaded with a supply of a cleaning agent such as a liquid soap or detergent. Auxiliary reservoir 82 is mounted on wand 4, as seen in FIG. 1, and is connected to nozzle 32 by means of a connecting tube 84 which conducts the cleaning agent to nozzle 32 where it mixes with the water or other washing liquid as the water is discharged through nozzle 32. The natural flow of water through the nozzle 32 will tend to draw the cleaning agent from auxiliary reservoir 82 through connecting tube 84 by a siphon action.

To facilitate rinsing, it may be preferable to inject a measured dosage of cleaning agent into nozzle 32 from auxiliary reservoir 82 on demand, in which case a pump 86 is mounted on auxiliary reservoir 82, as best seen in FIG. 3. Pump 86 is manually operated via plunger 88 and draws a measured amount of the cleaning agent from auxiliary reservoir 82 with each stroke of the plunger, the agent being injected into nozzle 32. It may also be desirable to facilitate the mixing of the cleaning agent with the washing liquid, therefore, a mixing chamber 90 is provided in nozzle 32. Mixing chamber 90 allows more time for the cleaning agent and the washing liquid to combine before the mixture is discharged from nozzle 32 onto the surface to be washed. A manually operable valve 91 may be provided between the reservoir 82 and mixing chamber 90 to prevent the flow of cleaning agent to the mixing chamber when the wand is used to rinse a previously washed surface.

In operation, wand 4 is first charged with a supply of the washing liquid, in this example, water, by engaging inlet tube 10 with filling tube 60 on charging stand 54 as seen in FIG. 6. Charging stand 54 is connected to a pressurized source of water, for example, a household tap via hose 58. When the inlet tube 10 and filling tube 60 are forcibly engaged, inlet valve 20 and filling valve 64 open and water under pressure flows into the reservoir 6 in wand 4. The hydraulic pressure from the source causes the water to fill reservoir 6 and displace the internal pressurizing means to a biasing position, for example, stretching tube 52 against the elastic forces of the tube, as seen in FIG. 5, or sliding piston 76 within piston chamber 6a against biasing spring 80, as seen in FIG. 8. The biasing means is then ready to apply a predetermined pressure to the water in the reservoir. Once wand 4 is charged with the pressurized supply of water, inlet tube 10 is disengaged from filling tube 60 as seen in FIG. 2. The inlet valve 20 and filling valve 64 close under their respective biasing means. Wand 4 is then separated from charging stand 54 and can be carried to the remote site to perform the washing and rinsing task. Valve 91 is opened and a cleaning agent, such as soap or detergent, is drawn from the auxiliary reservoir 82 by pump 86 and conveyed to nozzle 32 where the agent is injected into the mixing chamber 90. A squeeze of trigger 40 opens discharge valve 36 which allows water from reservoir 6 under a predetermined pressure from the reservoir biasing means to flow into the mixing chamber 90 and combine with the cleaning agent before being expelled through nozzle 32 and scrubbing means 48 onto the work surface. The portable wand 4 makes it easy and convenient for an operator to direct the stream of soapy water exactly where it is needed and nozzle 32 is curved to provide for ergonomically efficient use of the apparatus. Scrubbing means 48 comprising a mop or brush provides for convenient distribution of the soapy water to the work surface and allows the user to scrub down the surface, dislodging surface dirt and grime. After the application of the soap and the scrubbing of the work surface, a further squeeze of the trigger 40 discharges water from reservoir 6 (either valve 91 having been closed or all of the soap in mixing chamber 90 having been mixed and discharged previously) to rinse the work surface of the soap and the entrained dirt and grime. The operator is able to repeat these functions remote from the water source without heavy and unwieldy hoses constraining his movement, becoming wedged on an obstruction, becoming kinked or leaking.

I claim:

1. A washing apparatus for holding a supply of a washing liquid dispensed from a pressurized source of the washing liquid at a first pressure, said washing apparatus comprising:

a portable reservoir for holding the supply of washing liquid, said reservoir having a handle for manual gripping;

an inlet valve communicating with said reservoir and connected thereto for channeling the washing liquid into said reservoir, said inlet valve having a movable inlet valve element movable between a normally closed and an open position;

an independent charging stand for filling said reservoir with the supply of the washing liquid from the pressurized source, said stand having a coupling for connection to the pressurized source, said stand further comprising a filling valve interconnectable with the inlet valve, said filling valve comprising a movable filling valve element, said valve elements being biased to the closed position and being movable from the closed to the open position when said valves are forcibly interengaged, thereby allowing the washing liquid to enter said reservoir;

pressurizing means connected to said reservoir for pressurizing the supply of washing liquid held within said reservoir to a second pressure, said pressurizing means being biased to a pressurized status by the pressurized source at said first pressure;

a nozzle connected to said reservoir, said nozzle having a discharge valve for selectively discharging the washing liquid from said reservoir; and means operatively associated with said discharge valve for manually discharging of the washing liquid through said nozzle.

2. Apparatus according to claim 1, further comprising scrubbing means mounted on said nozzle.

3. Apparatus according to claim 1, said apparatus further comprising:

a second reservoir containing a supply of a second washing liquid; and a conduit connecting said second reservoir to said nozzle, said conduit conducting said second washing liquid to said nozzle, the second washing liquid mixing with the washing liquid within said nozzle when the washing liquid is selectively discharged.

4. Apparatus according to claim 3, further comprising means for controlling the amount of the second washing liquid conducted to said nozzle.

5. Apparatus according to claim 1, wherein said pressurizing means comprises an elastic bladder contained within said cavity and connected to said inlet and said nozzle, said bladder being filled with the washing liquid from the pressurized source by forcibly interengaging said inlet with said coupling on said charging stand thereby opening said inlet and filling valve elements, the washing liquid filling and elastically expanding said bladder to said pressurized status under said first pressure from the pressurized source, said inlet then being disengaged from said coupling, said wand being thereby separated from said charging stand, said inlet and filling valve elements being closed by said respective valve biasing means, the elastic forces of said bladder maintaining the washing liquid under said second pressure within said reservoir, the washing liquid being manually selectively discharged from said reservoir under said second pressure by opening said discharge valve via said manual discharge valve control means.

6. Apparatus according to claim 1, wherein said pressurizing means comprises:

a piston slidably mounted within said cavity, said piston interfitting within said cavity forming a water tight seal between said piston and said cavity, said water tight seal preventing the washing liquid from passing between said piston and said cavity; and a piston biasing means arranged within said wand and connected to said piston, said cavity being filled with the washing liquid from the pressurized source at said first pressure by forcibly interengaging said inlet with said coupling on said charging stand thereby opening said inlet and filling valve elements, the washing liquid being channeled into said reservoir by said inlet and sliding said piston within said cavity against said piston biasing means to said pressurized status under said first pressure from the pressurized source, said inlet then being disengaged from said coupling, said wand being thereby separated from said charging stand, said inlet and filling valve elements being closed by said respective valve biasing means, biasing forces of said piston biasing means biasing said piston and maintaining the washing liquid under said second pressure within said reservoir, the washing liquid being manually selectively discharged from said reservoir under said second pressure by opening said discharge valve via said manual discharge valve control means.

7. Apparatus according to claim 6, wherein said piston biasing means comprises a compression spring mounted within said cavity.

8. A washing apparatus for holding a supply of a washing liquid dispensed from a pressurized source, said washing apparatus comprising:

a portable elongated wand having first and second ends, said wand having an outer surface forming a handle means to facilitate manual gripping and manipulation, said wand having an internal cavity extending substantially from said first to said second ends;

an expandable reservoir for receipt of a supply of said washing liquid, said reservoir being disposed within said cavity;

reservoir biasing means for applying a predetermined pressure on the washing liquid within said expandable reservoir;

an inlet valve mounted on said first end of said wand and communicating with said expandable reservoir within said cavity;

a nozzle mounted on said first end of said wand and communicating with said reservoir;

a discharge valve between the reservoir and the nozzle;

manual operating means mounted on said wand for selectively opening and closing said discharge valve;

an inlet valve mounted on said first end of said wand, said inlet valve communicating with said expandable reservoir;

a charging stand independent of said wand; said charging stand having a coupling for connection to the pressurized source of washing liquid and a filling valve, a fluid connection between said coupling and said filling valve, said filling valve and said inlet valve having separate coupling parts interengagable in interfacing relationship to establish a fluid flow path for pressurized washing liquid for filling said reservoir, said reservoir biasing means being yieldably movable to a biasing position for applying said predetermined biasing pressure to the washing liquid in response to a filling of said reservoir, said predetermined pressure being sufficient to expel the washing liquid through the discharge valve and the nozzle upon operation of said manual operating means; and valve biasing means biasing the filling and inlet valves to a closed position when the coupling parts are separated and to an open position for filling said reservoir when said coupling parts are interengaged.

9. Apparatus according to claim 8, wherein said expandable reservoir comprises an elastic tube having first and second ends, said tube being disposed within said internal cavity of said wand, said first end of said tube being attached to said first end of said wand and communicating with said inlet valve and said discharge valve, said second end of said tube being attached to said second end of said wand, said wand having sealing means for sealing said second end of said tube, said tube being substantially smaller than said internal cavity of said wand, said tube elastically expanding to substantially the size of said cavity under pressure from the pressurized source when said tube is filled with the washing liquid, said elastic tube further comprising said biasing means for applying said predetermined pressure when said tube is filled with the washing liquid from the pressurized source.

10. Apparatus according to claim 8, wherein:

said expandable reservoir comprises a piston and a piston chamber within said cavity, said piston being slidably mounted relatively to said chamber;

said biasing means comprises a spring mounted within said cavity and applying a biasing force for biasing said piston toward said first end of said wand, pressure from the pressurized source forcing said piston against said biasing spring and moving said piston to said biasing position for applying said predetermined pressure when said chamber is filled with the washing liquid from the pressurized source.

11. Apparatus according to claim 8, wherein the distal end of said nozzle forms an angle with said wand.

12. Apparatus according to claim 8, wherein a scrubbing means is mounted on the distal end of said nozzle.

13. Apparatus according to claim 8, wherein said manual opening means comprises a trigger mounted on said wand.

14. Apparatus according to claim 8, further comprising:

a second reservoir mounted on said wand, said second reservoir holding a supply of a cleaning agent;

a conduit connecting said second reservoir to said nozzle, said conduit for conveying the cleaning agent to said nozzle, the cleaning agent being drawn from said second reservoir into said nozzle when said washing liquid is discharged from said reservoir, said cleaning agent thereby mixing with said washing liquid.

15. Apparatus according to claim 8, further comprising:

a second reservoir mounted on said wand, said second reservoir holding a supply of a cleaning agent;

a conduit connecting said second reservoir to said nozzle, said conduit for conveying the cleaning agent to said nozzle;

a pump mounted on said second reservoir and operatively associated with said conduit, said pump drawing the cleaning agent from said second reservoir and injecting the agent into said nozzle, said cleaning agent thereby mixing with said washing liquid when said washing liquid is discharged from said reservoir.

16. Apparatus according to claim 15, wherein the cleaning agent is soap.

17. Apparatus according to claim 12, wherein said scrubbing means comprises a brush.

18. A washing apparatus containing a supply of a washing liquid dispensed from a pressurized source of the washing liquid, said washing apparatus comprising:

a portable elongated tubular wand having first and second ends, a handle means and an internal reservoir;

a manifold mounted on said first end of said elongated wand;

an inlet tube communicating with said manifold;

a nozzle communicating with said manifold;

a manifold port communicating between said manifold and said reservoir;

an inlet valve interposed between said inlet tube and said manifold;

a discharge valve interposed between said nozzle and said manifold, said discharge valve having valve biasing means for biasing said discharge valve in a closed position, said discharge valve further having means for manually opening said discharge valve;

a charging stand for filling said reservoir with the washing liquid from the pressurized source, said charging stand being connected to the pressurized source and having a filling tube interengagable with said inlet tube, said filling tube having a filling valve interposed between said filling tube and said pressurized source, said inlet valve and said filling valve each having means for opening said valves simultaneously when said inlet tube is forcibly interengaged with said filling tube, said inlet valve and said filling valve each further having means for closing said valves when said inlet tube is disengaged from said filling tube and said wand is separated from said stand; and biasing means for pressurizing the supply of washing liquid held in said reservoir, said biasing means being mounted within said wand and being biased to a pressurized status by the pressure of the pressurized source when said reservoir is filled.

19. Apparatus according to claim 18, wherein said means for manually opening said discharge valve comprises a trigger mounted on said wand, said trigger being operatively connected to and controlling said discharge valve thereby selectively controlling the discharge of the washing liquid from said reservoir.

20. Apparatus according to claim 18, further comprising:

a second reservoir mounted on said wand, said second reservoir containing a supply of a cleaning agent;

a mixing chamber interposed between said discharge valve and said nozzle;

a pump mounted on said second reservoir; and a tube connecting said pump to said mixing chamber, said pump drawing the cleaning agent from said second reservoir and injecting the cleaning agent into said mixing chamber via said tube.

21. Apparatus according to claim 18, wherein said reservoir comprises an elastic tube arranged within said wand, said elastic tube having a first end connected to said manifold port, said second end of said elastic tube being connected to said second end of said wand, said second end of said wand having means for sealing said second end of said elastic tube, said elastic tube elastically expanding upon filling with the supply of the washing liquid and serving as said biasing means for pressurizing the supply of the washing liquid when said inlet tube is disengaged from said filling tube and said wand is separated from said charging stand.

22. Apparatus according to claim 18, wherein said reservoir comprises the interior of said tubular wand and said pressurizing means comprises:

a piston slidably mounted within said reservoir, said piston having sealing means forming a water tight seal between said piston and the interior of said wand; and a biasing spring interposed between said piston and said second end of said wand, said spring biasing said piston toward said first end of said wand, said piston being moved within said reservoir against said biasing spring to said pressurized status when said reservoir is filled, said piston and said biasing spring pressurizing the supply of the washing liquid in said reservoir when said inlet tube is disengaged from said filling tube and said wand is separated from said charging stand.

23. Apparatus according to claim 18, further comprising a means for scrubbing mounted on the distal end of said nozzle.

* * * * *

UNITED STATES PATENT AND TRADEMARK OFFICE
CERTIFICATE OF CORRECTION

PATENT NO. : 5,769,324
DATED : June 23, 1998
INVENTOR(S) : Lenhart

It is certified that error appears in the above-identified patent and that said Letters Patent is hereby corrected as shown below:

On the title page, after item [56] insert
--FOREIGN PATENT DOCUMENTS--
    --2542 1/1909 Britain--

Column 1, line 64, delete "to"

Signed and Sealed this

Fifteenth Day of September, 1998

Attest:

BRUCE LEHMAN

*Attesting Officer*  *Commissioner of Patents and Trademarks*